(12) United States Patent
Kawamoto (10) Patent No.: US 7,076,654 B2
(45) Date of Patent: Jul. 11, 2006

(54) MULTICAST SYSTEM, AUTHENTICATION SERVER TERMINAL, MULTICAST RECEIVER TERMINAL CONTROLLING METHOD, AND STORAGE MEDIUM

(75) Inventor: Akiko Kawamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 703 days.

(21) Appl. No.: 09/805,116

(22) Filed: Mar. 14, 2001

(65) Prior Publication Data

US 2001/0023487 A1    Sep. 20, 2001

(30) Foreign Application Priority Data

Mar. 15, 2000  (JP)  ............................ P2000-073064

(51) Int. Cl.
*H04L 9/00* (2006.01)
(52) U.S. Cl. ...................... 713/163; 713/185; 726/3
(58) Field of Classification Search ................ 713/202, 713/181, 163, 200, 201, 183, 185; 709/228–229; 380/21; 705/32; 726/3
See application file for complete search history.

(56) References Cited

U.S. PATENT DOCUMENTS

| | | | | |
|---|---|---|---|---|
| 5,748,736 A | * | 5/1998 | Mittra | 713/163 |
| 5,970,477 A | * | 10/1999 | Roden | 705/32 |
| 6,195,751 B1 | * | 2/2001 | Caronni et al. | 713/163 |
| 6,275,859 B1 | * | 8/2001 | Wesley et al. | 709/229 |
| 6,546,488 B1 | * | 4/2003 | Dillon et al. | 713/181 |
| 6,629,243 B1 | * | 9/2003 | Kleinman et al. | 713/163 |

FOREIGN PATENT DOCUMENTS

| | | |
|---|---|---|
| JP | 10-40154 | 2/1998 |
| JP | 11-27252 | 1/1999 |
| JP | H11-55647 A | 2/1999 |
| JP | 11-127197 | 5/1999 |
| JP | 2000-78196 A | 3/2000 |

* cited by examiner

*Primary Examiner*—Hosuk Song
*Assistant Examiner*—T. B. Truong
(74) *Attorney, Agent, or Firm*—Sughrue Mion, PLLC (57) ABSTRACT

A multicast system comprises: a sender terminal for transmitting multicast data; a receiver terminal for receiving multicast data; an authentication server processor for managing the sender terminal and the receiver terminal; a first user processor provided in the sender terminal for transmitting a login requirement to the authentication server processor; and a second user processor provided in the receiver terminal for transmitting a login requirement to the authentication server processor, so that a user is identified by individually authenticating the user using a specified authentication server.

10 Claims, 7 Drawing Sheets

MULTICAST SYSTEM, AUTHENTICATION SERVER TERMINAL, MULTICAST RECEIVER TERMINAL CONTROLLING METHOD, AND STORAGE MEDIUM

BACKGROUND OF THE INVENTION

1. Field of the Invention

The present invention relates to data communication by a multicast system, particularly, a system for identifying a user by individually authenticating the user using a specified authentication server.

This application is based on Japanese Patent Application No. 2000-73064 filed in Japan, the contents of which are incorporated herein by reference.

2. Description of Related Art Including Information Disclosed Under 37 CFR 1.97 and 37 CFR 1.98

A multicast system has a concept synthesizing the concepts of both a unicast system and a broadcast system. Without sending multicast data to a specific host (unicast) or to all hosts on a network (broadcast), a data packet in the multicast data is sent to any number of hosts at the same time. It is known that when a sender sends data to a multicast group address, anyone who requires to receive the data can receive the data. Furthermore, a data stream protecting method using encryption is well-known, that is, the data packet is encrypted at the sender's side and the encrypted data packet is decrypted at the receiver's side.

Generally, a secret key cryptosystem is used to encrypt the data packet. An example of a conventional data flow protecting method in a multicast system is disclosed in Japanese Unexamined Patent Application, First Publication, Nos. Hei 11-27252 (JP 11-27252) and Hei 11-127197 (JP 11-127197). JP 11-27252 discloses that a pair of keys which is used for data encryption/decryption (public key/secret key) is stored in a key management device and the multicast system is introduced into a decryption key distribution. JP 11-127197 discloses that any keys which are used for a user authentication (public key/private key) are stored in a domain name server or a certification authority.

Furthermore, JP 11-127197 discloses a data flow protecting method in a conventional multicast system, in which a routing element controls the retrieval of a public key installed in the domain name server by a multicast router when a user sends a join request to the multicast system and the determination of whether or not the user should be authenticated. If the user is not authenticated by the routing element, the unauthenticated user is not permitted access.

In the multicast technique in JP 11-27252, there is a problem in that a decryption key can be acquired by an unspecified and large number of users and any user which has the decryption key can decrypt the encrypted data after a release time. In JP 11-127197, since only a user who is permitted transmission of data can acquire the encryption key, the unreliable transmitted data can be prevented. However, an unspecified and large number of users who are hierarchically placed equal to or lower than a router can acquire decryption keys, and any user which has the decryption key can decrypt the encrypted data. Therefore, there is a problem in that any user, regardless of being registered in the certificated server, can transmit and receive the multicast data.

Furthermore, in multicast data communication, one problem is raised in that at the present time, the sender cannot identify users who transmit and receive the multicast data, and therefore, the sender cannot answer to users individually. As a result, a host on the network informs a local multicast router of group membership information using an IGMP (Internet Group Management Protocol), and the local multicast router transfers only the necessary packets in the group membership information to a local machine. The multicast router only has to select a packet of a host group to be sent to a subnet of the multicast router, therefore, neither a manager nor the participants can know a specific user who participates in the multicast communication or the number of participants.

Furthermore, another problem is raised in that the users are not aware of important multicast data that may be stolen. If participants are identified, maintenance for each user can be conducted using broadcast/conference functions by the multicast communication.

BRIEF SUMMARY OF THE INVENTION

The present invention solves the above-mentioned problems, and an object of the present invention is to provide a multicast system which identifies a user by individually authenticating the user using a specified authentication server in multicast data communication.

To achieve the above object, the first aspect of the present invention provides a multicast system comprising: a sender terminal for transmitting multicast data; a receiver terminal for receiving multicast data; an authentication server processor for managing the sender terminal and the receiver terminal; a first user processor provided in the sender terminal for transmitting a login requirement to the authentication server processor; and a second user processor provided in the receiver terminal for transmitting a login requirement to the authentication server processor.

Furthermore, in the multicast system, the sender terminal may encrypt multicast data and transmit encrypted multicast data to the receiver terminal when the first user processor transmits the login requirement to the authentication server processor and when the authentication server processor permits login.

Moreover, in the multicast system, the receiver terminal registered in the authentication server processor may decrypt encrypted multicast data using an encryption key distributed from the authentication server processor and receive decrypted multicast data in an application provided in the receiver terminal when the second user processor transmits the login requirement to the authentication server processor and when the authentication server processor permits login.

Furthermore, in the multicast system, a receiver terminal, other than the receiver terminal registered in the authentication server processor, may be rejected an encryption key distribution from the authentication server processor when the second user processor transmits the login requirement to the authentication server processor and when the authentication server processor rejects the login requirement. According to this system, multicast data cannot normally be received in the application by a user who is not registered in the authentication server processor.

Moreover, in the multicast system, the authentication server processor may execute a logout when the second user processor in the receiver terminal does not receive a periodically distributed encryption key which is periodically generated by the authentication server processor and distributed to the receiver terminal. According to this system, multicast data can be secured since the system prevents the encryption key from being stolen and decrypted by a third person.

Furthermore, in the multicast system, the second user processor may transmit a logout requirement to the authentication server processor, and the authentication server processor may terminate user management when multicast data communication is terminated in an application in the receiver terminal.

According to the first aspect of the present invention, since an authentication history of a user from conducting logins and logouts, and a participation history of a user from periodically retransmitting the encryption key are stored, the present participants and the number of participants in the corresponding multicast group can be identified. Furthermore, since a login and logout state of each user and a receiving state of the receiver (a receiving start time and a receiving termination time) are managed by the user ID, a sender can find a receiver who desires to receive data from the sender and therefore, this system is effectively used for user management.

Additionally, since all access is stored as a history, the system can determine illegal access (login by a user not registered, multiple logins by the same user, and the like). Particularly, when important data is transmitted, it is necessary that the data is prevented from leaking to a third person. Since information of all users who access the multicast group is managed in the multicast system, the system can rapidly determine illegal access by a third person and deal with the illegal access.

Furthermore, the multicast system can operate with either a plurality of subnetworks or no subnetworks.

The second aspect of the present invention provides an authentication server terminal comprising: an authentication server processor; a first receiving section for receiving a login requirement transmitted from a first user processor provided in a sender terminal which transmits multicast data; a second receiving section for receiving a login requirement transmitted from a second user processor provided in a sender terminal which receives multicast data; and a user registration information section for registering a user's individual information, wherein the user uses the sender terminal, the sender terminal which is permitted login by the authentication server processor encrypts multicast data and transmits encrypted multicast data, and the receiver terminal, which is registered as a user in the user registration information section by the authentication server processor, is permitted login and receives multicast data.

The third aspect of the present invention provides a multicast receiver terminal management method comprising the steps of: registering a user's individual information, wherein the user uses a sender terminal; receiving a login requirement transmitted from the sender terminal which transmits multicast data; managing the sender terminal which is permitted login so as to encrypt multicast data and to transmit encrypted multicast data; receiving a login requirement transmitted from a receiver terminal which receives multicast data; and managing the receiver terminal, which is registered as a user in a user registration information section by an authentication server processor, so as to be permitted login and to receive multicast data.

Furthermore, since the user's individual information, wherein the user uses the sender terminal, is registered, a user's individual information, wherein the user uses the receiver terminal, may be registered. If a receiving function is provided in the sender terminal and a sending function is provided in the receiver terminal, since the same authentication system is used in the authentication server, the sender terminal can receive data and the receiver terminal can transmit data.

The fourth aspect of the present invention provides a storage medium which is readable by a computer, for storing a multicast receiver terminal management method program for conducting multicast data communication in a computer; the multicast receiver terminal management method program comprises the steps of: a registration step in which a user's individual information is registered, wherein the user uses a sender terminal; a receiving step in which a login requirement, transmitted from the sender terminal which transmits multicast data, is received; a managing step in which the sender terminal, which is permitted login, is managed so as to encrypt multicast data and to transmit encrypted multicast data; a receiving step in which a login requirement, transmitted from the sender terminal which receives multicast data, is received; a managing step in which a receiver terminal, which is registered as a user in a user registration information section by an authentication server processor, is managed so as to be permitted to login and to receive multicast data.

Each of the second, third, and fourth aspects of the present invention can obtain the same effects as the first aspect of the present invention.

DETAILED DESCRIPTION OF THE INVENTION

The preferred embodiments of the present invention will be explained with reference to the figures.

Figure 1:
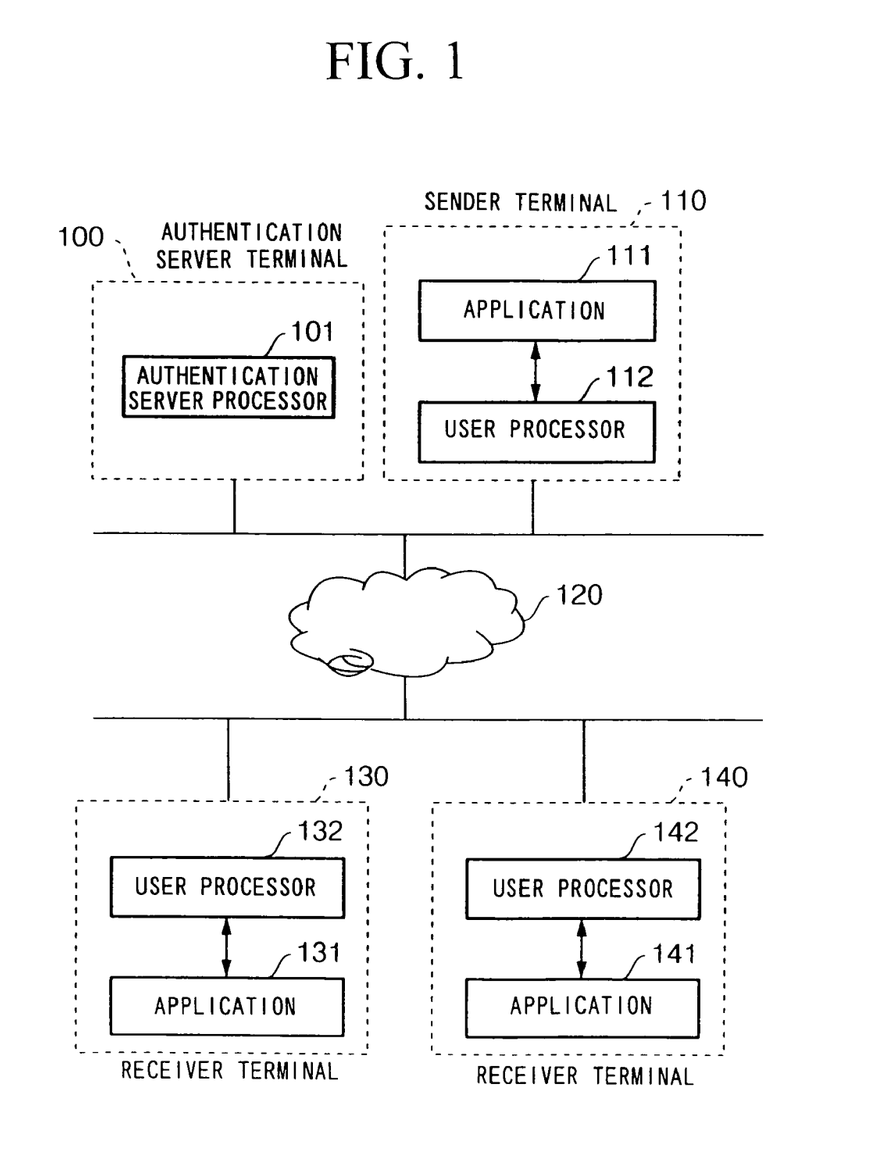
FIG. 1 is a block diagram showing an embodiment of the present invention.

As shown in FIG. 1, an embodiment of the user management security system in multicast data communication of the present invention comprises an authentication server terminal 100, a sender terminal 110, receiver terminals 130 and 140, and a subnetwork 120 such as the internet/intranet.

Figure 2:
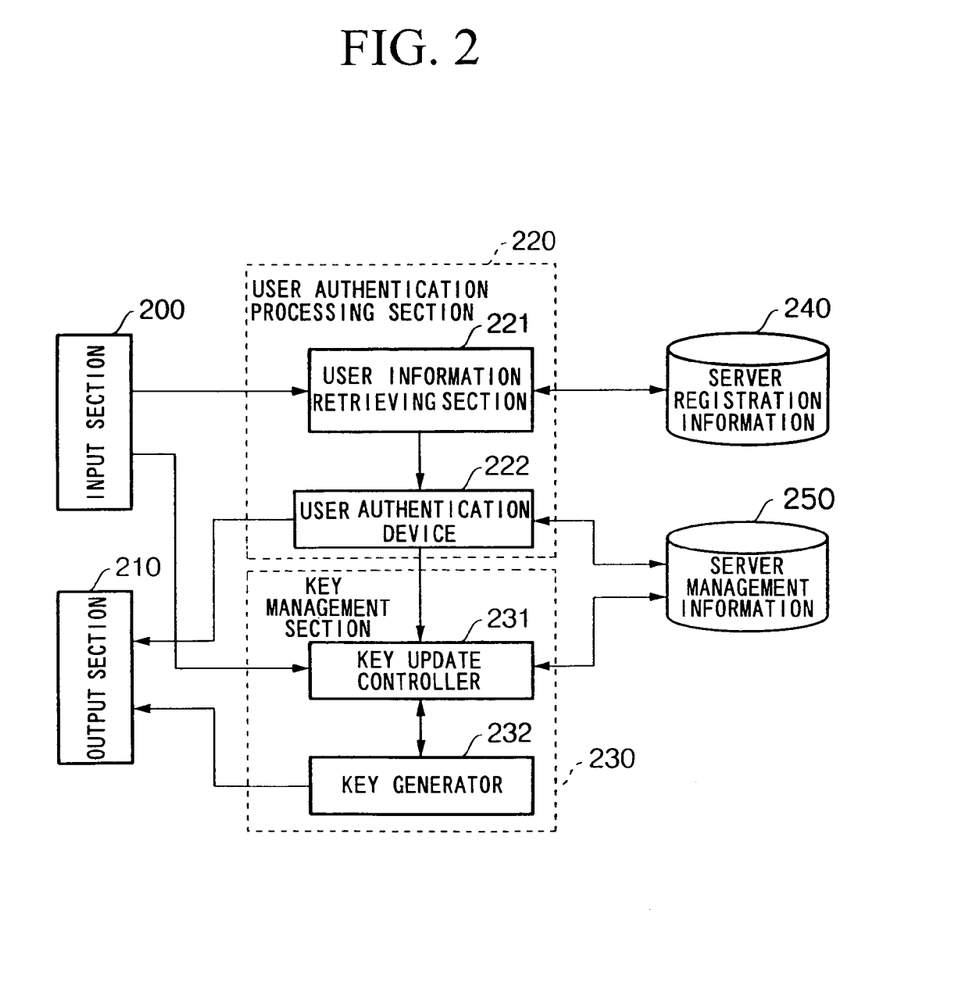
FIG. 2 is a block diagram showing a structure of an authentication server terminal according to an embodiment of the present invention.

As shown in FIG. 2, the authentication server terminal 100 is essentially composed of an input section 200 from a network, an output section 210 to the network, a user authentication processing section 220, a key management section 230, server registration information 240, and server management information 250. Furthermore, the user authentication processing section 220 comprises a user information retrieving device 221 and a user authentication device 222.

Figure 3:
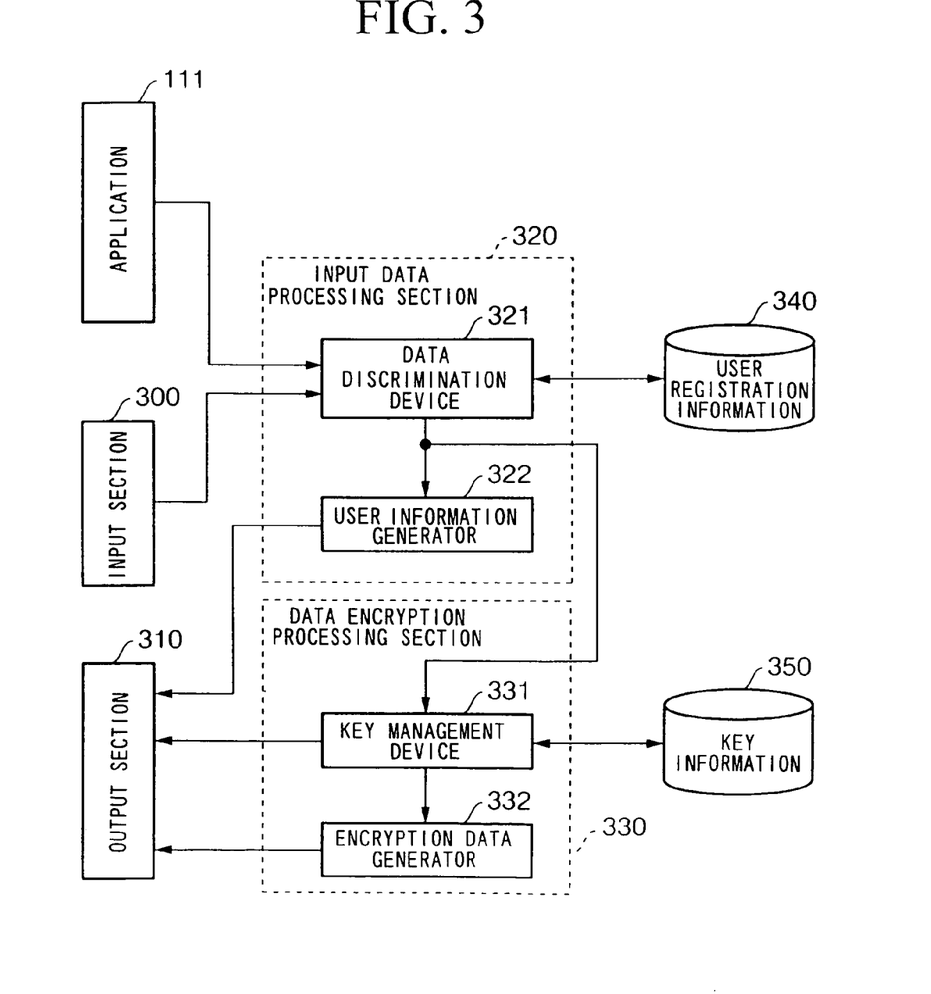
FIG. 3 is a block diagram showing a structure of a sender terminal according to an embodiment of the present invention.

As shown in FIG. 3, the sender terminal 110 is essentially composed of an input section 300 from the network, an output section 310 to the network, an input data processing section 320, a data encryption processing section 330, user registration information 340, key information 350, and an application 111 which can conduct multicast communication. Furthermore, the input data processing section 320 comprises a data discrimination device 321 and a user information generator 322. The data encryption processing section 330 comprises a key managing device 331 and an encryption data generator 332.

Figure 4:
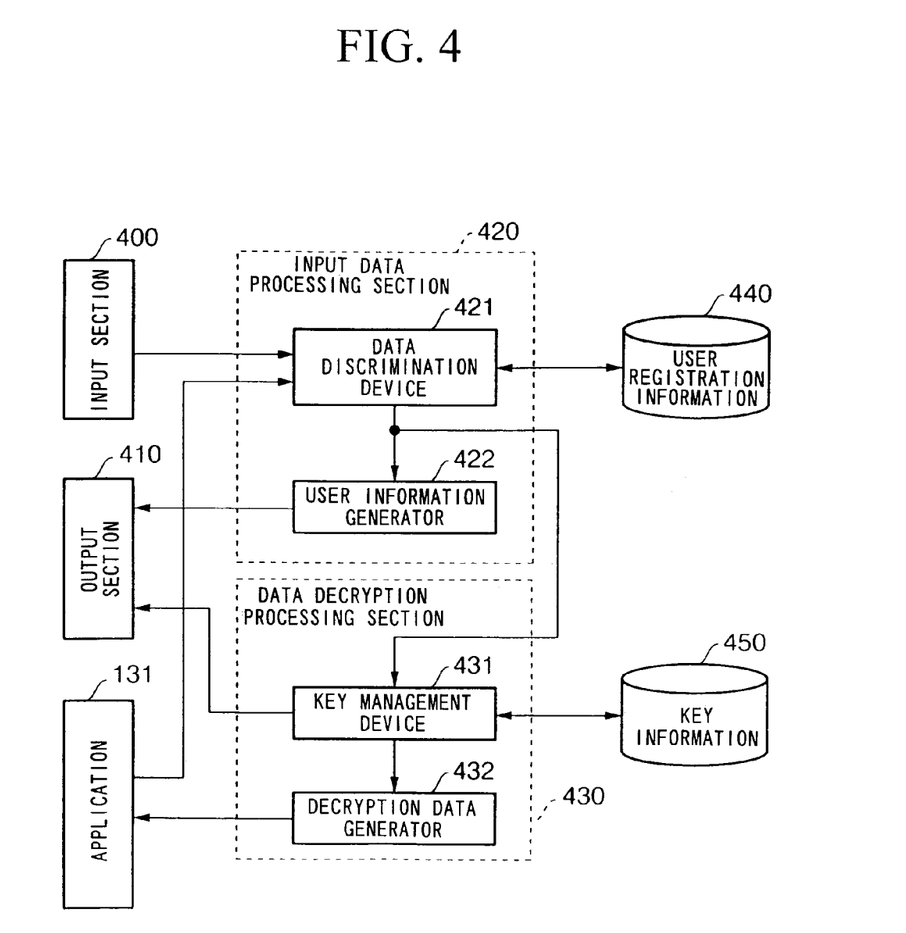
FIG. 4 is a block diagram showing a structure of a receiver terminal according to an embodiment of the present invention.

As shown in FIG. 4, each of the receiver terminals 130 and 140 is essentially composed of an input section 400 from the network, an output section 410 to the network, an input data processing section 420, a data decryption processing section 430, user registration information 440, key information 450, and an application 131 which can conduct multicast communication. Furthermore, the input data processing section 420 comprises a data discrimination device 421 and a user information generator 422. The data encryption processing section 430 comprises a key managing device and a decryption data generator 432.

These sections will be outlined as follows.

The server registration information 240 is program information registered beforehand which is to be multicast-communicated (for example, a multicast address, a port number, an update time of the encryption key, and the like) and user information which is to be permitted for transmitting/receiving in a program (for example, a user ID, a user's public key, and the like). The program indicates a multicast data communication in which a multicast address and a port number, which are fixed by an organizer of a broadcast or a conference using the multicast data communication, are used and conducted from a start time to an end time of a data transmission, which are fixed by the organizer. Furthermore, the user registration information 340 and 440 are individual information of the user registered beforehand (for example, a user ID, a program ID of a program in which to participate, an authentication server ID, and the like).

In the authentication server processor 101, the input section 200 receives a login/logout requirements transmitted from a user and an acknowledgement receipt (ACK), and the output section 210 transmits an authenticated result by the user authentication processor 220 or an encryption key generated by the key management section 230. Both the input section 200 and the output section 210 are communication devices. The server authentication processor 101 receives the logout requirement, stops the update/repeat, and terminates user management. This series of user management information is written in the server management information 250.

In the sender terminal 110, the input data processing section 320 discriminates multicast data received from the application 111 and the encryption key received in the input section 300. The output section 310 transmits the login/logout requirement information generated in the user information generator 322, the acknowledgment receipt (ACK), and the multicast data encrypted by the data encryption processing section 330.

In the receiver terminals 130 and 140, the input data processing section 420 discriminates the multicast data and the encryption key received from the input section 400. The output section 410 transmits the login/logout requirement information generated in the user information generator 422 and the acknowledgement receipt (ACK) from the data decryption processing section 430. The multicast data decrypted by the decryption data generator 432 is displayed by the application 131.

This embodiment of the present invention will be explained in detail as a whole with reference to FIG. 5 which is a flowchart of FIG. 2, and FIG. 6 which is a flowchart of FIGS. 3 and 4.

In the authentication server terminal, at first, encrypted login requirement information is received using a digital signature by a secret key of a user so as to start management of the user (participant). The process flow of the user will be explained later. The login requirement information comprises a time stamp in addition to a user ID and a program ID (Step A1 of FIG. 5). In the user information retrieving device 221, a corresponding public key of the user is retrieved by the user ID registered in the server registration information 240, and the login requirement information is decrypted by the public key. Furthermore, the user information retrieving device 221 confirms whether or not the user ID corresponding to a program in which the user intends to participate is registered (Step A2 of FIG. 5). If the user ID is registered, the login requirement is authenticated, and the authentication result is stored in the server management information 250. If the user ID is not registered, the login requirement is rejected, and data which the login requirement has rejected is encrypted so as to inform the user. This refusal result is stored in the server management information 250 (Step A3 of FIG. 5).

Figure 5:
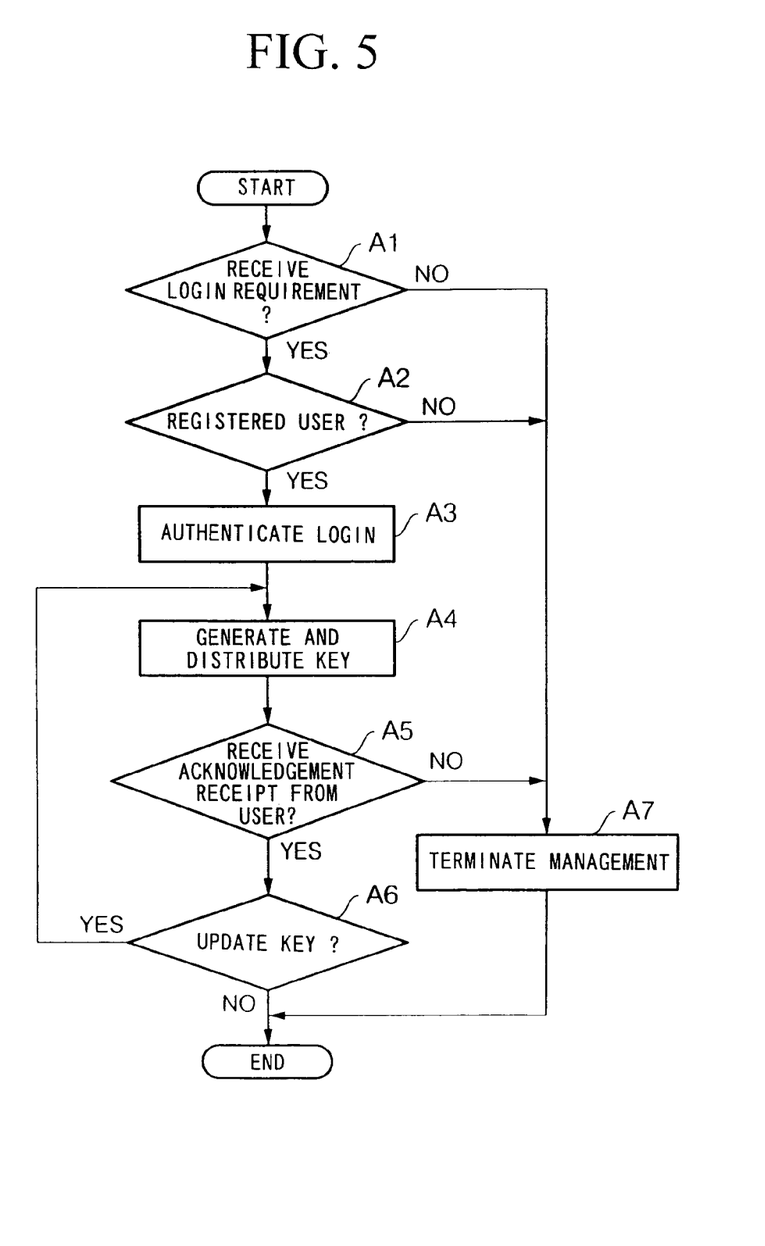
FIG. 5 is a flowchart showing the authentication server terminal according to an embodiment of the present invention.

Next, a common key, in which the digital signature is written by the secret key in the authentication server terminal, is encrypted using the public key of the user, and the encrypted common key is transmitted to the user; thereafter, an encryption key encrypted using the common key is transmitted to the user (Step A4 of FIG. 5). If a key update controller 231 receives an acknowledgement receipt of the key from the user, this result is stored in the server management information 250. If the key update controller 231 has not received the acknowledgement receipt of the key from the user within a predetermined time, the key update controller 231 regards this as that the user has terminated receiving, a logout process is executed, and this result is stored in the server management information 250 (Step A5 of FIG. 5).

Furthermore, in order to prevent the encryption key from being illegally obtained and used, the key update controller 231 controls the key distribution so that the encryption key is periodically retransmitted after the authentication time at a predetermined time. If there is a program to be executed to which the user ID is registered, an updated encryption key is distributed to the user. When the program ends, the encryption key distribution ends (Step A6 of FIG. 5). If the authentication server terminal receives a logout requirement from the user, the updated encryption key distribution to the corresponding user is ended, and a logout is executed. The information indicating that the logout has been executed, is encrypted and transmitted to the corresponding user. This result is stored in the server management information 250 (Step A1 of FIG. 5).

Next, the sender terminal and the receiver terminal will be explained with reference to FIG. 6.

Figure 6:
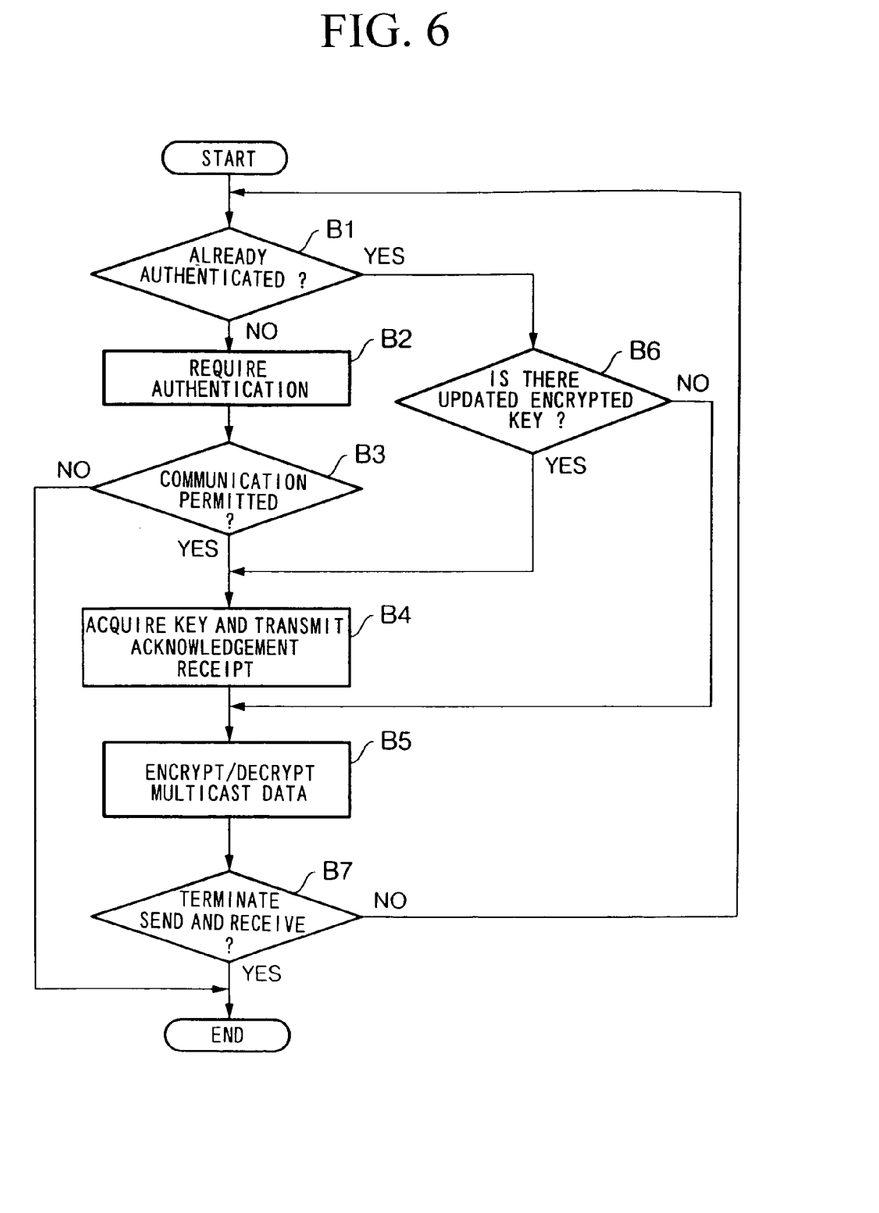
FIG. 6 is a flowchart showing the sender terminal and the receiver terminal according to an embodiment of the present invention.

When the sender transmits multicast data using the application 111, the data discrimination device 321 confirms whether or not the multicast data communication has already been authenticated by the authentication server (Step B1 of FIG. 6). If the multicast data communication has not been authenticated, the sender/receiver terminal acquires a user ID, a program ID (multicast data and a port number), and an authentication server ID (an address and a port number), the login requirement information is generated in the user information generator 322, and the login requirement information is transmitted to the authentication server terminal which is registered beforehand (Step B2 of FIG. 6). If communication to a corresponding multicast group is permitted by this authentication result, the sender receives the encrypted encryption key. If communication to a corresponding multicast group is not permitted, the sender terminal terminates transmission of multicast data (Step B3 of FIG. 6). The encryption key generated by a secret key cryptosystem is used in order to prevent illegal access by a third person. To decrypt the encryption key, a common key is acquired, in which a digital signature is conducted using the secret key of the authentication server after login. Subsequently, it is confirmed that the digital signature was conducted by a legal authentication server and is managed in the key information 350 by the key management device 331.

Subsequently, the distributed encryption key is decrypted using the stored common key, and the acknowledgement receipt is transmitted to the authentication server (Step B4 of FIG. 6). Multicast data is encrypted using the encryption key in an encryption data generator 332, and the encrypted multicast data and the encryption key ID are transmitted (Step B5 of FIG. 6). After authentication, multicast data is continuously transmitted, and if an updated encryption key is received from the authentication server, an acknowledgement receipt is transmitted. If an updated encryption key is not received, multicast data is encrypted using an existing encryption key (Step B6 of FIG. 6). The above flow is repeated while multicast data is continuously transmitted, and when a data discrimination device 321 receives a requirement of a send termination from the application 111, a user ID, a program ID (a multicast address and a port number), and an authentication ID (an address and a port number) are acquired from the user registration information 340. Subsequently, logout requirement information is generated in the user information generator 322, transmitted to the authentication server, and multicast communication is terminated (Step B7 of FIG. 6).

The flow process for the receiver is basically the same as the flow process for the sender. When multicast data is received, at first, the data discrimination device 421 confirms whether or not the multicast communication has been authenticated by the authentication server (Step B1 of FIG. 6). If the multicast communication has not been authenticated, a user ID, a program ID (a multicast address and a port number), and an authentication ID (an address and a port number) are acquired from the user registration information 440. Subsequently, login requirement information is generated in the user information generator 422 and transmitted to the authentication server which is registered beforehand (Step B2 of FIG. 6). When the authentication result is received and the multicast communication to the corresponding multicast group is permitted, the encrypted encryption key is received. If the multicast communication is not permitted, the receiving of multicast data is terminated (Step B3 of FIG. 6). The encryption key generated by a secret key cryptosystem is used in order to prevent illegal access by a third person. To decrypt the encryption key, a common key is acquired, in which the digital signature is conducted using the secret key of the authentication server after login. Subsequently, it is confirmed that the digital signature was conducted by a legal authentication server and is managed in the key information 450 by the key management device 431.

Subsequently, the distributed encryption key is decrypted using the stored common key, and an acknowledgement receipt is transmitted to the authentication server (Step B4 of FIG. 6). The corresponding encryption key is retrieved by the encryption key ID in the decryption data generator 432, the multicast data is decrypted using the encryption key, and the decrypted multicast data is received in the application 131 (Step B5 of FIG. 6). After authentication, multicast data is continuously transmitted and if an updated encryption key is an updated encryption key is not received, multicast data is decrypted using the existing encryption key (Step B6 of FIG. 6). The above flow is repeated while multicast data is continuously transmitted, and when the data discrimination device 421 receives a requirement of a send termination from the application 131, a user ID, a program ID (a multicast address and a port number), and an authentication ID (an address and a port number) are acquired from the user registration information 440. Subsequently, logout requirement information is generated in the user information generator 422, transmitted to the authentication server, and multicast communication is terminated (Step B7 of FIG. 6).

Next, another embodiment of the present invention will be explained as follows.

In the above-mentioned embodiment, if the sender manages the authentication server, the authentication server is preferably provided in the sender terminal. As a result, the structure of the sender terminal can be simplified and the sender can manage the encryption key for the sender without leaking the encryption key on a network.

Figure 7:
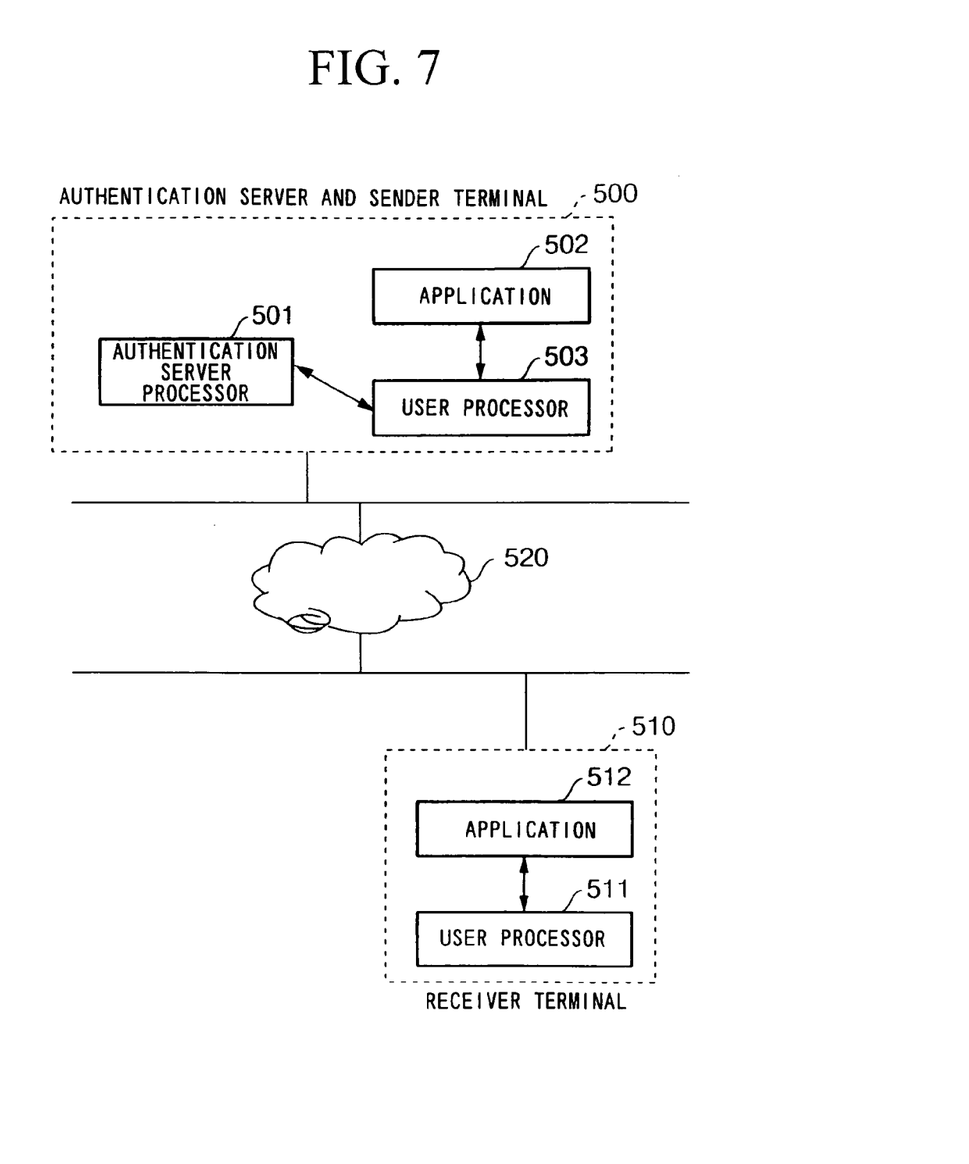
FIG. 7 is a block diagram showing another embodiment of the present invention.

With reference to FIG. 7, this embodiment of the present invention comprises an authentication server with a sender terminal 500, a receiver terminal 510, and a subnetwork 520 such as the internet/intranet. The authentication server with a sender terminal 500 comprises an authentication server processor 501, an application corresponding to a multicast system 502, and a user processor 503. The receiver terminal comprises an application corresponding to a multicast system 511 and a user processor 512.

The authentication server with a sender terminal 500 is arranged by combining the structures shown in FIG. 2 and FIG. 3, and the receiver terminal 510 is arranged having the same structure as the receiver terminal of FIG. 4. There is a difference between the above-mentioned embodiment and this embodiment in that the input sections 200 and 300, and the output sections 210 and 310 are communication sections for a network in the former, while the output section 210 is output to the input section 300 and the output section 310 is output by the user information generator 322 and the key management device 331 to the input section 200 in the latter.

In the multicast system according to this embodiment, as a whole, the authentication server with a sender terminal 500 conducts the flow shown in FIGS. 5 and 6 in parallel, and the receiver terminal 510 conducts the same flow as shown in FIG. 6.

As mentioned above, the embodiments of the present invention are explained in detail with reference to the figures; however, the specific configuration is not limited to these embodiments and can comprise other designs which are within the scope of the present invention.

What is claimed is:

1. A multicast system comprising:
a sender terminal for transmitting multicast data;
a receiver terminal for receiving multicast data;
an authentication server processor for managing the sender terminal and the receiver terminal;
a first user processor provided in the sender terminal for transmitting a login requirement to the authentication server processor; and
a second user processor provided in the receiver terminal for transmitting a login requirement to the authentication server processor,
wherein the authentication server processor executes a logout when the second user processor in the receiver terminal does not receive a periodically distributed encryption key which is periodically generated by the authentication server processor and distributed to the receiver terminal.

2. A multicast system according to claim 1, wherein the sender terminal encrypts multicast data and transmits encrypted multicast data to the receiver terminal when the first user processor transmits the login requirement to the authentication server processor and when the authentication server processor permits login.

3. A multicast system according to claim 1, wherein the receiver terminal registered in the authentication server processor decrypts encrypted multicast data using an encryption key distributed from the authentication server processor and receives decrypted multicast data in an application provided in the receiver terminal when the second user processor transmits the login requirement to the authentication server processor and when the authentication server processor permits login.

4. A multicast system according to claim 1, wherein a receiver terminal, other than the receiver terminal registered in the authentication server processor, is rejected an encryption key distribution from the authentication server processor when the second user processor transmits the login requirement to the authentication server processor and when the authentication server processor rejects the login requirement.

5. A multicast system according to claim 1, wherein the second user processor transmits a logout requirement to the authentication server processor and the authentication server processor terminates user management when multicast data communication is terminated in an application in the receiver terminal.

6. An authentication server terminal comprising:
an authentication server processor;
a first receiving section for receiving a login requirement transmitted from a first user processor provided in a sender terminal which transmits multicast data;
a second receiving section for receiving a login requirement transmitted from a second user processor provided in a receiver terminal which receives multicast data; and
a user registration information section for registering user's individual information, wherein the user uses the sender terminal,
the sender terminal which is permitted login by the authentication server processor encrypts multicast data and transmits encrypted multicast data, and
the receiver terminal, which is registered as a user in the user registration information section by the authentication server processor, is permitted login and receives multicast data,
wherein the authentication server processor executes a logout when the second user processor in the receiver terminal does not receive a periodically distributed encryption key which is periodically generated by the authentication server processor and distributed to the receiver terminal.

7. A multicast receiver terminal management method comprising the steps of:
registering a user's individual information transmitted from a sender terminal;
receiving a login requirement transmitted from the sender terminal which transmits multicast data;
managing the sender terminal which is permitted login so as to encrypt multicast data and to transmit encrypted multicast data;
receiving a login requirement transmitted from a receiver terminal which receives multicast data;
managing the receiver terminal which is registered as a user in a user registration information section by an authentication server processor, so as to be permitted login and to receive multicast; and
executing a logout when the receiver terminal does not receive a periodically distributed encryption key which is periodically generated and distributed to the receiver terminal.

8. A storage medium which is readable by a computer, for storing a multicast receiver terminal management method program for conducting multicast data communication in a computer, the multicast receiver terminal management method program comprising the steps of:
a registration step in which a user's individual information is registered, wherein the user uses a sender terminal;
a receiving step in which a login requirement, transmitted from the sender terminal which transmits multicast data, is received;
a managing step in which the sender terminal, which is permitted login, is managed so as to encrypt multicast data and to transmit encrypted multicast data;
a receiving step in which a login requirement, transmitted from the sender terminal which receives multicast data, is received;
a managing step in which a receiver terminal, which is registered as a user in a user registration information section by an authentication server processor, is managed so as to be permitted to login and to receive multicast data; and
wherein the authentication server processor executes a logout when the receiver terminal does not receive a periodically distributed encryption key which is periodically generated by the authentication server processor and distributed to the receiver terminal.

9. The multicast system according to claim 1, wherein the login requirement of the first user processor and the second user processor is encrypted.

10. The authentication server terminal according to claim 6, wherein the login requirement of the first user processor and the second user processor is encrypted.

* * * * *